US011465846B2

(12) United States Patent
Rasmussen et al.

(10) Patent No.: US 11,465,846 B2
(45) Date of Patent: Oct. 11, 2022

(54) DYNAMIC CART OPTIMIZATION SYSTEM

(71) Applicant: PACKSIZE, LLC, Salt Lake City, UT (US)

(72) Inventors: Jeffrey L. Rasmussen, South Jordan, UT (US); Eric Branch Bulloch, Midvale, UT (US); Kevin Bradon Maughan, Riverton, UT (US); Andreas Harnesk, Sandy, UT (US); Rodney Gallaway, McRae, AR (US)

(73) Assignee: PACKSIZE LLC, Salt Lake City, UT (US)

( * ) Notice: Subject to any disclaimer, the term of this patent is extended or adjusted under 35 U.S.C. 154(b) by 181 days.

(21) Appl. No.: 16/942,541

(22) Filed: Jul. 29, 2020

(65) Prior Publication Data

US 2021/0032029 A1 Feb. 4, 2021

Related U.S. Application Data

(60) Provisional application No. 62/882,158, filed on Aug. 2, 2019.

(51) Int. Cl.
*G06F 7/00* (2006.01)
*B65G 1/137* (2006.01)
(Continued)

(52) U.S. Cl.
CPC ......... *B65G 1/1371* (2013.01); *B65G 1/1373* (2013.01); *G06Q 10/04* (2013.01); *G06Q 10/087* (2013.01)

(58) Field of Classification Search
CPC .... B65G 1/1371; B65G 1/1373; G06Q 10/04; G06Q 10/087
(Continued)

(56) References Cited

U.S. PATENT DOCUMENTS 11,284,041 B1 * 3/2022 Bergamo .................. G06T 7/70
2017/0220984 A1 8/2017 Pattathil et al.
(Continued)

FOREIGN PATENT DOCUMENTS

JP 2018-513503 A 5/2018
JP 2019-529279 A 10/2019

OTHER PUBLICATIONS

Henn et al. Order Batching in Order Picking Warehouses: A Survey of Solution Approaches., Jan. 31, 2011, [retrieved on Jan. 10, 2020]. Retrieved from the Internet: <URL:https://www .fww .ovgu .de/ fww_media/femm/femm_2011/2011_01-EGOTEC-jq3c558nh8pk1 lv5rr7k87pitq1vicso.pdf> pp. 1-30.
(Continued)

*Primary Examiner* — Yolanda R Cumbess
(74) *Attorney, Agent, or Firm* — Workman Nydegger

(57) ABSTRACT

A computer system for optimizing node and edge selections within a digital graph model accesses a digital graph model of a physical warehouse location. The digital graph model comprises information indicating a location of multiple specific items of inventory among shelves in the physical warehouse location. The computer system identifies a set of orders that each comprise one or more items and an order priority. The computer system then maps each item in each order selected from the set or orders to the multiple nodes within the digital graph model. The computer system identifies a ranking node from the multiple nodes. The computer system then traverses one or more edges that extend from the ranking node to identify a shortest path within the digital graph model to fill a digital model of a picking cart above a packing threshold level.

20 Claims, 7 Drawing Sheets

(51) Int. Cl.
*G06Q 10/04* (2012.01)
*G06Q 10/08* (2012.01)

(58) Field of Classification Search
USPC .......................................... 700/213–216, 228
See application file for complete search history.

(56) References Cited

U.S. PATENT DOCUMENTS

| | | |
|---|---|---|
| 2018/0059635 A1 | 3/2018 | Johnson et al. |
| 2018/0265297 A1 | 9/2018 | Nakano et al. |
| 2018/0275680 A1 | 9/2018 | Gupta et al. |
| 2018/0357601 A1 | 12/2018 | Beach et al. |
| 2022/0164077 A1* | 5/2022 | Chandler .............. G06F 3/0482 |

OTHER PUBLICATIONS

International Search Report and Written Opinion received for PCT Patent Application No. PCT/US2020/044240, dated Oct. 19, 2020, 13 pages.

Key et al., Warehouse Pick Path Optimization Algorithm Analysis, Aug. 19, 2015, [retrieved on Jan. 10, 2020], Retrieved from the Internet: <URL: https://search.proquest.com/docview/1705166060/abstract/EF 1FF419E59949BAPQ/>pp. 63-69.

Lu et al., An algorithm for dynamic order-picking in warehouse operations., May 19, 2015, [retrieved on Jan. 10, 2020] Retrieved from the Internet: <URL:https://www.repository.cam.ac.uk/bitstream/handle/1810/248883/Lu%20et%20al%202015%20European%20Journal%20of%20Operational%20Research.pdf?sequence=1 > pp. 1-36.

\* cited by examiner

DYNAMIC CART OPTIMIZATION SYSTEM

CROSS-REFERENCE TO RELATED APPLICATIONS

This application claims the benefit of and priority to U.S. Provisional Patent Application Ser. No. 62/882,158 filed on Aug. 2, 2019 and entitled "DYNAMIC CART OPTIMIZATION SYSTEM," which application is expressly incorporated herein by reference in its entirety.

BACKGROUND

The recent and rapid growth of e-commerce has placed significant burdens on the shipping and packaging industry. Not only has the volume of shipped products significantly increased, but the speed with which the products are expected to be delivered has also significantly increased. Previously, it may have been acceptable for packages to arrive 5-6 business days after placing an order. Current market forces, however, demand that packages arrive within two days, and in some cases on the same day that the order was placed.

In order to meet these quickly growing demands, the packaging and shipping industries have been required to innovate and develop new systems and machines to increase efficiency and speed. One area that efficiency has been increased is through the use of custom-made packaging systems that are able to create made-to-fit packages for a wide assortment of different orders. These custom-made packages reduce wasted space within shipping vehicles and within storage facilities allowing for more orders to be shipped within the same vehicle.

An area of packaging and shipping that is in need of technological improvements is the area relating to picking technologies. "Picking" is the process of gathering items within a warehouse for shipping. Typically, an order is received at the warehouse, and a pick request is made to go gather the items in the order so that they can be shipped to the recipient of the order. The processes and machines utilized in gathering the order can significantly impact the efficiency, cost, and speed with which an order is gathered and prepared for shipping. There is a need in this field for technological solutions that improve picking systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include a computer system for optimizing node and edge selections within a digital graph model. The computer system comprises one or more processors and one or more computer-readable media having stored thereon executable instructions that when executed by the one or more processors configure the computer system to perform various acts. For example, the computer system can access a digital graph model of a physical warehouse location. The digital graph model comprises information indicating a location of multiple specific items of inventory among shelves in the physical warehouse location. Additionally, the digital graph model comprises multiple nodes and multiple edges, the multiple nodes each representing a different physical area within the physical warehouse location and the multiple edges each representing a physical pathway between each node within the multiple nodes and each node's immediate neighbors.

The computer system can further identify, within an order request database, a set of orders, wherein each order within the set of orders comprises one or more items and an order priority. The computer system then maps each item in each order selected from the set or orders to the multiple nodes within the digital graph model. The computer system identifies a ranking node from the multiple nodes. The ranking node comprises a node with the highest number of mapped items. The computer system then traverses one or more edges that extend from the ranking node to identify a shortest path within the digital graph model to fill a digital model of a picking cart above a packing threshold level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

DETAILED DESCRIPTION

Disclosed embodiments are directed towards systems for optimizing node and edge selections within a digital graph model of a warehouse location. In particular, disclosed embodiments generate a digital graph model that comprises nodes that represent a physical layout of a warehouse location. The digital graph model also comprises edges extending between one or more of the nodes. In at least one embodiment, the digital graph model comprises a graph database. A computer system is configured to map items within one or more orders onto the digital graph model and iteratively traverse edges within the model in order to generate an optimized selection of nodes and edges. As used herein, an "order" comprises a group of items intended for packaging within a single package. One will appreciate, however, that in some embodiments, multiple orders may be packaged within a single package. Similarly, a customer may order a large number of items, which may be divided into multiple orders that are divided between multiple packages.

Optionally, the computer system may also utilize a cubing processor to process a cubing algorithm on the items within the one or more orders while the computer system is traversing the edges and the nodes. The output of the cubing algorithm may be applied against a packing threshold level to determine when an optimal node and edge selection has been identified. In at least one embodiment, the packing threshold level is applied to a picking cart to determine when the selected items within the one or more orders would sufficiently fill the picking cart.

One will appreciate that the embodiments disclosed herein provide for more efficient picking systems. Pick requests are dynamically generated within an optimized route to ensure the most efficient, best use of a picking cart within the warehouse location. Further, disclosed embodiments are highly customizable such that they can be implemented at a wide number of different locations, within different picking systems, and with different picking technologies.

Figure 1:
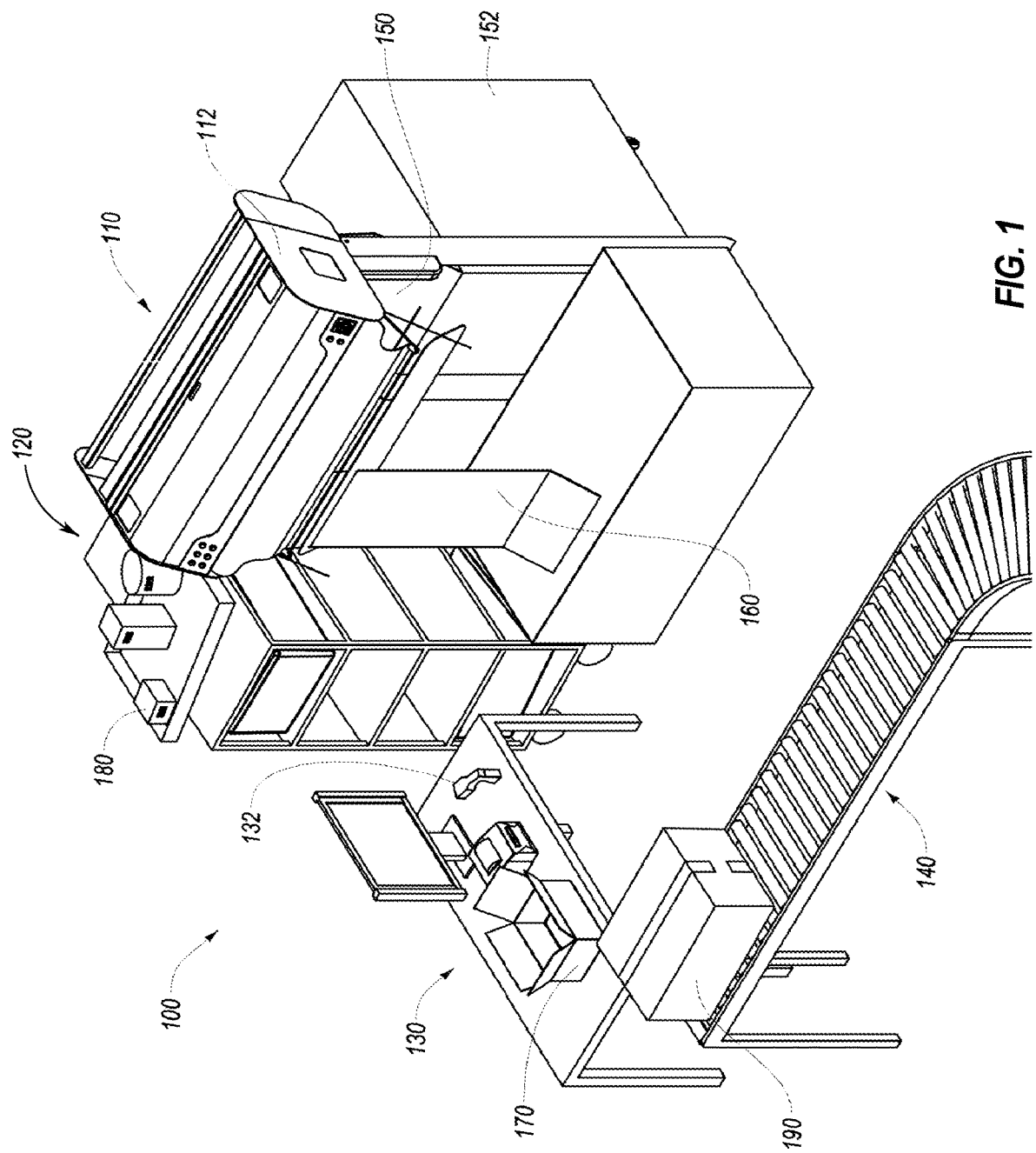
FIG. 1 illustrates an embodiment of a packaging cell.

Turning now to the figures, in at least one embodiment, as illustrated in FIG. 1, a shipper can have one or more packaging cells 100, which can include equipment for packaging available orders and preparing the same for shipment. For example, the packaging cell 100 can include a packaging system 110, an available-order transport system 120, a work area 130, a tracking-code scanner 132, and a processed-order transport system 140. The packaging system 110 can include a converting machine 112 that can receive fanfold material 150 from one or more bales 152. The packaging system 110 can process the fanfold material 150 into custom made-to-order packaging templates 160. An operator can retrieve the packaging templates 160 from the packaging system 110 and can form boxes 170 for shipment of available orders 180. As used herein, the term "available order" refers to any order (whether a single-item order or multi-item order) that can be processed as one unit by the shipper.

The picking cart 120 can transport various available orders 180 to the work area 130 for packaging and preparation for shipment. In some embodiments, the picking cart 120 can be a conveyor system or movable shelving system that can transport the available orders 180 to the work area 130. When the available orders 180 arrive at the work area 130, the operator can request packaging templates 160 to be prepared by the packaging system 110. In at least one embodiment, an operator requests the packaging templates 160 by scanning, with the tracking-code scanner 132, a code associated with each respective available-order 180. As further described below, such packaging templates 160 can be custom-sized based on the particular dimensions of the available orders 180 to be packaged.

In addition to packaging the available orders 180, the operator can prepare the available orders 180 for shipment by attaching required labels and other materials. Once the available order 180 is processed (i.e., packaged and/or prepared for shipment), such processed order 190 can be transported away from the work area 130 via the processed-order transport system 140. For instance, the processed-order transport system 140 can transport the processed orders 190 to a shipping area. In some implementations, the processed-order transport system 140 can be a conveyor belt that can connect the work area 130 and a desired location for the processed orders 190. In other embodiments, the processed-order transport system 140 can be a movable shelving system that can transport the processed orders 190 away from the work area 130.

One will appreciate that the packaging cell 100 of FIG. 1 is provided only for the sake of example and context. In various embodiments, different configurations and types of packaging systems can be utilized. For example, the packaging system may utilize standard die-cut boxes, dunnage systems, different workflows, or any number of other packaging systems and styles. Similarly, the packing cell 100 may utilize a number of different picking cart 120 configurations. For example, the picking cat 120 may compromise automated picking carts, human-driven picking carts, tote-based picking carts, or any number of other picking carts. Unless specifically mentioned otherwise, all embodiments of the dynamic cart optimization system disclosed herein can be used within any packaging configuration, picking configuration, or warehouse configuration. As such, when specific examples of packaging configuration, picking configuration, or warehouse configuration are used herein, they are provided only for the sake of example and explanation and do not limit the invention to a particular embodiment.

Figure 2:
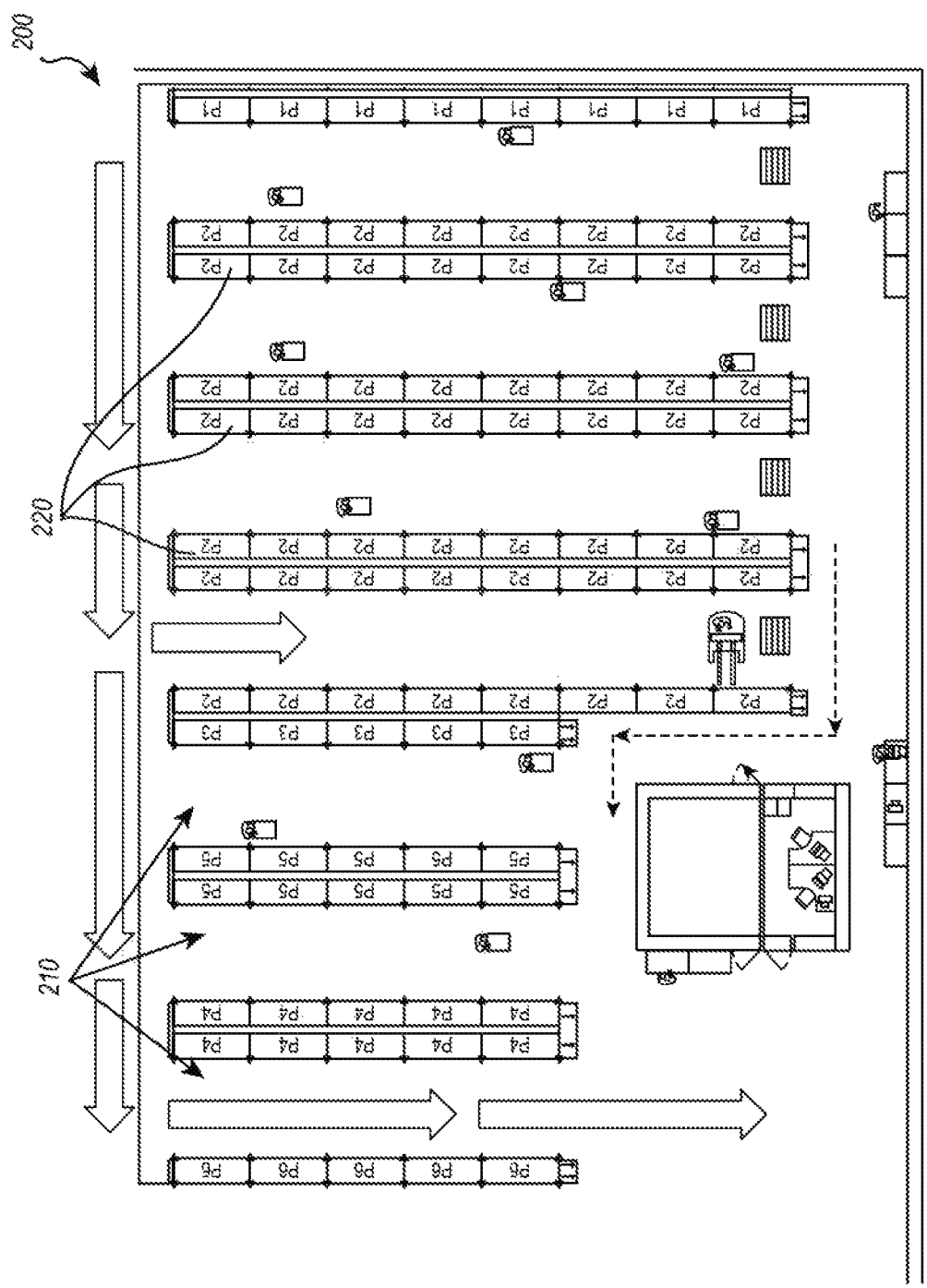
FIG. 2 illustrates a schematic of an embodiment of a warehouse location.

FIG. 2 illustrates a schematic of an embodiment of a warehouse location 200. As used herein, a "warehouse location" 200 comprises any physical location that is utilized for temporarily holding goods for processing and shipping. The depicted warehouse location 200 comprises multiple aisles 210 divided by multiple shelves 220. One will appreciate that in a typical warehouse location 200, the multiple shelves 220 are stocked with items waiting for shipment.

FIG. 2 further illustrates arrows that indicate the conventional flow of picking traffic throughout the warehouse location 200. As indicated, conventional picking carts 120 are pushed along a common path around the warehouse location 200. When an aisle is reached that holds items of interest, the human operator will push the picking cart 120 down the aisle and remove the desired goods from the shelf. Such a process can typically require each and every human operator and picking cart 120 to travel a complete, or nearly complete, circuit of the entire warehouse location 200 for every pick request that is generated.

Figure 3:
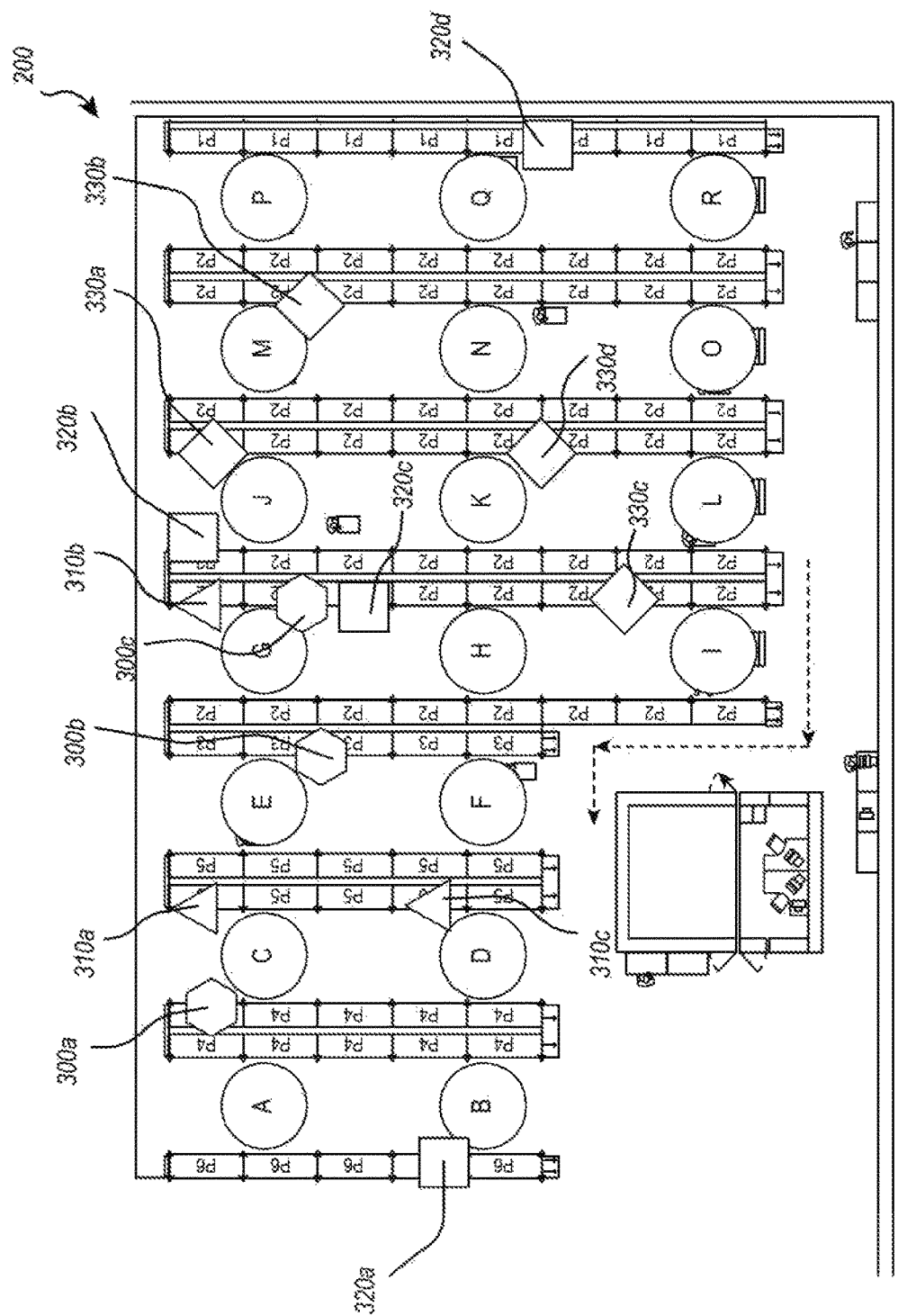
FIG. 3 illustrates the schematic of the embodiment of a warehouse location of FIG. 2 with nodes and order items superimposed upon the schematic.

FIG. 3 illustrates the schematic of the embodiment of a warehouse location 200 of FIG. 2 with nodes and order items superimposed upon the schematic. The nodes are depicted as circles and labelled with letters A-R. The nodes represent different locations within the warehouse location 200. For example, each aisle is divided into multiple nodes based upon the length of the aisle. The depicted spacing of the nodes (A-R) is provided for the sake of example and explanation. In other embodiments, the nodes (A-R) may be placed closer or farther apart based upon a desired resolution within the warehouse location 200.

The order items are depicted as hexagons 300($a$-$c$), triangles 310($a$-$c$), squares 320($a$-$d$), and diamonds 330($a$-$d$). The order items are grouped by shape based upon orders. As such, each item associated with a particular order is shown with a common shape. For example, each of items 300($a$-$c$)

are associated with a hexagon and are included within a single order. In particular, item 300*a* is positioned on a shelf near Node C, item 300*b* is positioned on a shelf near Node E, and item 300*c* is on a shelf near Node G. The different items 300(*a-c*) within the order may comprise any type or combination of goods that are housed within the warehouse location 200.

Figure 4:
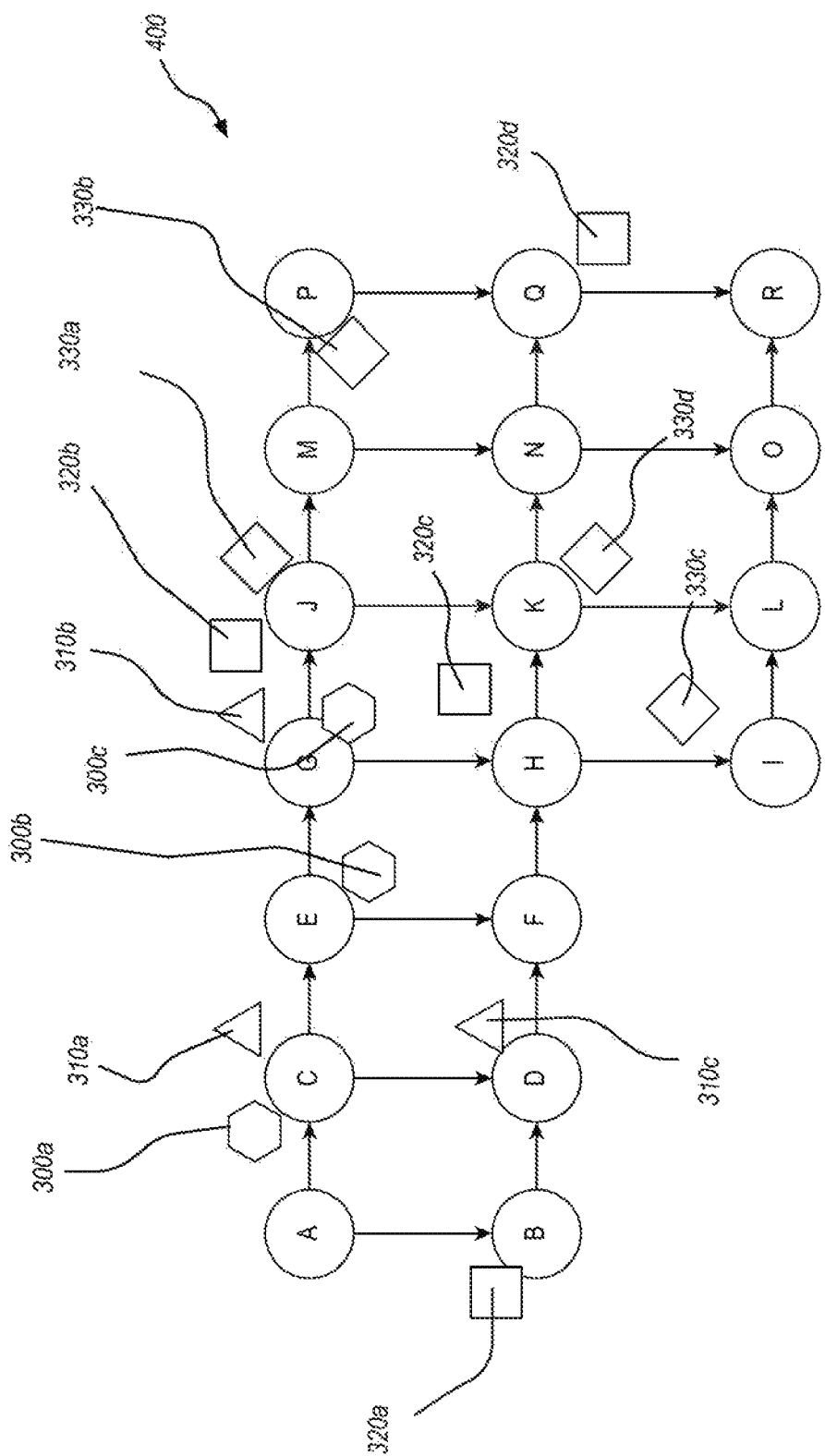
FIG. 4 illustrates a digital graph model of a physical warehouse location depicted in FIG. 2.

FIG. 4 illustrates a digital graph model 400 of a physical warehouse location 200 depicted in FIG. 2. The digital graph model 400 comprises a computer representation of the nodes of FIG. 3 connected through edges, which are depicted as arrows connecting various nodes. The edges are representative of physical pathways within the warehouse location 200 between different nodes. For example, a user and a picking cart 120 can travel directly between node A and node C as indicated by the connecting edge.

Figure 5:
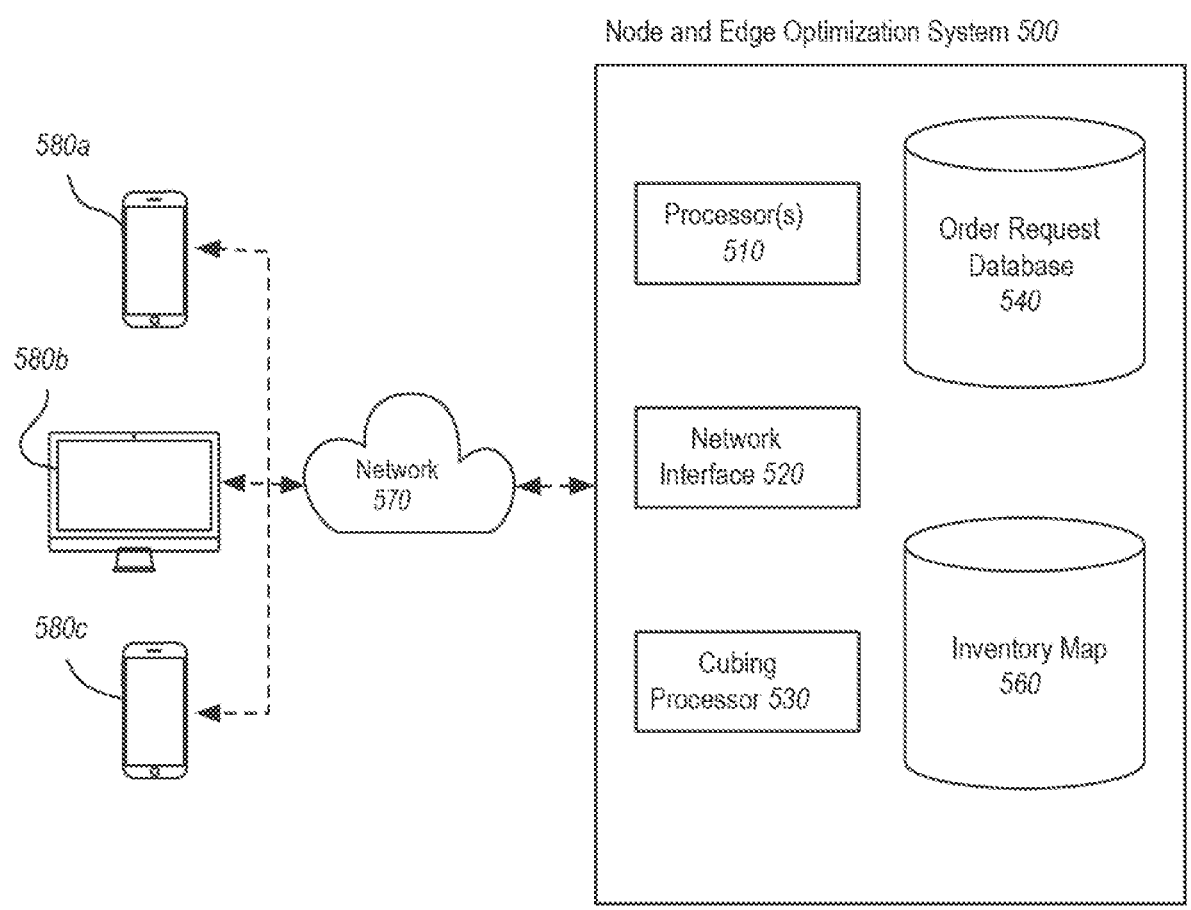
FIG. 5 illustrates a schematic of an embodiment of a computer system for identifying a pick request path and generating a pick request.

FIG. 5 illustrates a schematic of an embodiment of a node and edge optimization computer system 500 for identifying a pick request path and generating a pick request. In at least one embodiment, the one or more processors 510 within the computer system 500 pre-calculate or calculate the shortest distances (also referred to as "hops") between each and every node. For example, the computer system 500 determines that the shortest hop between node A and node B is one hop. In contrast, the computer system determines that the shortest distances between node A and node N is six hops. This process is continued until the shortest distances between every node is identified.

In at least one embodiment, the computer system 500 receives an order and stores it within the order request database 540. The order may be received through a network interface 520 from one or more customers 580(*a-c*) over a network connection 570, such as the Internet. In at least one embodiment, multiple users can request a cart at the same time. Additionally, in at least one embodiment, the computer system 500 is capable of handling multiple build cart requests at the same time.

In response to receiving the order, one or more processors 510 access the digital graph model 400 of the physical warehouse location 200. As explained above and depicted in FIG. 4, the digital graph model 400 comprises information indicating a location of multiple specific items of inventory among shelves in the physical warehouse location 200. Additionally, the digital graph model 400 comprises multiple nodes (A-R) and multiple edges connecting the nodes (A-R). The multiple nodes (A-R) each represent a different physical area within the physical warehouse location 200 and the multiple edges each representing a physical pathway between each node within the multiple nodes and each node's immediate neighbors.

The computer system 500 identifies, within the order request database 540, a set of orders that each comprises one or more items and an order priority. The order request database 540 comprises a queue of orders that are ready to be picked and packaged. In some embodiments, one or more orders may be associated with an order priority. The order priority indicates the urgency with which an order needs to be picked and shipped. For instance, the warehouse location 200 may offer same day shipping for some orders. Such an order would be associated with a high priority level. Similarly, particular orders may be associated with particular shippers that arrive at the warehouse location 200 for shipping at specific times of day. In such a case, orders associated with those shippers may become high priority if the arrival time of the shipper is approaching.

The one or more processors 510 map each item in each order selected from the set of orders to the multiple nodes within the digital graph model 400. The one or more processors 510 utilize information stored within the inventory map 560 to map the items to the appropriate nodes. For example, the inventory map 560 may comprise a database associating every item within the warehouse location 200 with its nearest node (A-R). In at least one embodiment, the inventory map 560 and the order request database 540 are stored within the same database. Accordingly, the computer system 500 is configured to lookup each item in an order and determine which items map to which nodes within the warehouse location 200.

Once the one or more processors 510 map each item in each order to the multiple nodes (A-R) with the digital graph model 400, the one or more processors 510 identify the nodes with which each order within the set of orders is associated. For instance, the one or more processors 510 identify that the order 300 (depicted by the hexagons) is associated with Nodes C, E, and G, order 310 (depicted by triangles) is associated with nodes C, G, and D, order 320 (depicted by squares) is associated with nodes B, G, J, and Q, and order 330 (depicted by diamonds) is associated with nodes J, M, I, and K.

The one or more processors 510 then identify a ranking node from the multiple nodes. The ranking node comprises a node with the highest number of mapped items. For example, as depicted in FIG. 4, node G is the ranking node because it is associated with three different items (300*c*, 310*b*, and 320*c*), which is higher than the number of items associated with any other node. One will appreciate that any number of methods can be used to identify the ranking node when a subset of nodes have the same highest number of associated items. For example, in such a case, the ranking node can be selected at random from the subset of nodes.

Once a ranking node (e.g., node G) is identified, the one or more processors 510 traverse one or more edges that extend from the ranking node to identify a shortest path within the digital graph model to fill a digital model of a cart above a packing threshold level. The packing threshold may be determined by results of a cubing algorithm that cubes the ordered items with respect to volume available on a picking cart 120. The packing threshold may additionally and/or alternatively comprise a weight metric that ensures that a picking cart 120 does not exceed a predetermined weight.

In at least one embodiment, traversing the one or more edges that extend from the ranking node G to identify the shortest path within the digital graph model 400 comprises accessing the ranking node within the digital graph model 400 and then identifying a subset of orders within the one or more orders that are each associated with at least one item located at the ranking node G. For instance, as depicted in FIG. 4, order 300 (i.e., items 300*a*, 300*b*, 300*c*, and 300*d*) has an item 300*c* associated with ranking Node G. Additionally, order 310 (i.e., items 310*a*, 310*b*, and 310*c*) has an item 310*b* associated with ranking Node G. Similarly, order 320 (i.e., items 320*a*, 320*b*, 320*c*, and 320*d*) has an item 320*c* associated with ranking node G. As such, the subset of orders 300, 310, and 320 each have an item associated with ranking node G.

The computer system 500 then identifies a set of the associated nodes that are associated with orders having items at node G. For instance, item 300*c* of order 300 is associated with node G. The remaining nodes associated with order 300 are Nodes C and E. Additionally, item 310*b* of order 310 is associated with node G. The remaining nodes associated with order 310 are nodes C and D. Further, item 320*c* of order 320 is associated with Node G. The remaining nodes associated with order 320 are nodes B, J, and Q.

Accordingly, in the example depicted by FIG. 4, nodes B, C, D, E, G, J, and Q are all considered "associated nodes."

Once the associated nodes are identified, the one or more processors 510 traverse each edge extending from the ranking node G to the one or more associated nodes. As the computer system 500 traverses along the edges between ranking node G and each associated node (B, C, D, E, J, and Q), the computer system 500 identifies additional items associated with orders within the subset of orders. For example, at node E, the computer system 500 identifies item 300b, which is associated with order 300. At node J, the computer system 500 identifies item 320b, which is associated with order 320. While traversing to node Q, at node P the computer system 500 does not identify any items associated with the subset of orders.

The computer system 500 identifies one or more completed orders by continuing to traverse each edge extending from the ranking node to each of the one or more associated nodes until the one or more completed orders are completely accounted for among the traversed nodes. As used herein, a "completed order" is an order where every item in the order has been identified along the traversal path from the ranking node to the associated nodes.

The computer system 500 then generates a pick request based upon a shortest path within the digital graph model to fill a digital model of a picking cart 120 above a packing threshold level. The pick request comprises one or more orders selected from the set of orders that are located along the shortest path. The shortest path comprises the shortest physical travel distance, as represented by the edges within the digital graph model 400, needed to fill the digital model of the cart above the packing threshold level.

In at least one embodiment, determining that the digital model of the picking cart is filled above the packing threshold level with the one or more completed orders comprises the application of a cubing algorithm to the one or more completed orders. Any of a number of conventional cubing algorithm may be utilized to determine whether the identified items in the one or more completed orders are capable of fitting within the available shelf space of the picking cart 120. Additionally, the packing threshold level may comprise a volume utilization limit and/or a weight limit. For instance, a picking cart 120 may only be configured to hold a predetermined maximum amount of weight. Further, the individual shelves within the picking cart 120 may be configured to hold a predetermined maximum amount of weight. Similarly, each shelf within the picking cart 120 may be associated with a particular volume. Using this information, the cubing algorithm is able to determine whether items within a particular completed order are capable of fitting on the picking cart 120 on a weight and/or volume utilization basis. Additionally, the cubing algorithm is able to determine whether a picking cart 120 has been underutilized and only filled below a desired packing level threshold. For example, the picking cart 120 may only be filled such that it utilizes half of its available volume. In contrast, the packing level threshold may indicate that picking carts should be filled to utilize at least eighty-percent of their volume. Accordingly, in at least one embodiment, the packing level threshold may comprise both lower and upper bounds.

As the computer system 500 processes each completed order through the cubing algorithm, orders that contain items that do not fit on the picking cart 120 are removed from the subset of orders and are left in place to be picked up by a later pick request. As such, as the computer system 500 traverses the edges within the digital graph model 400 of the warehouse location 200, the cubing algorithm and the packing threshold are used to filter out orders that are not suitable for a given pick request. In at least one embodiment, orders that are outside the subset of orders but that happen to be completable based upon the traversal path through the digital graph model 400 may be added to the subset of orders.

In at least one embodiment, the computer system 500 is also capable of dynamically adapting to an order priority. As mentioned above, an order priority may be associated with one or more items within the order request database 540. In at least one embodiment, if an order is of a high enough priority, the computer system 500 includes, within the pick request, a particular order that is associated with a particular order priority that exceeds a priority threshold. For example, a particular warehouse location 200 may set a priority threshold such that same day deliveries are placed within a pick request as soon as possible. In such, a warehouse location 200, the computer system 500 may identify an order with a same-day priority. In response to identifying that the order priority exceeds the priority threshold, the order may be added to a pick request even through the particular order does not fall along the shortest path.

In at least one embodiment, once a pick request is generated, the computer system 500 displays, on a user interface, one or more visual directions for a user to travel within the physical warehouse location 200 to complete the pick request. For example, a mobile computing device held by the user may depict a map with instructions for traveling within the warehouse location 200 in order to complete the pick request. Similarly, the instructions may be displayed on a device integrated into the picking cart 120, integrated into shelves within the warehouse location 200, or otherwise displayed to the user. Further, in at least one embodiment, the computer system 500 may be configured to generate one or more computer instructions for communication to an automated picking device, wherein the one or more computer instructions cause the automated picking device to travel along the shortest path.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
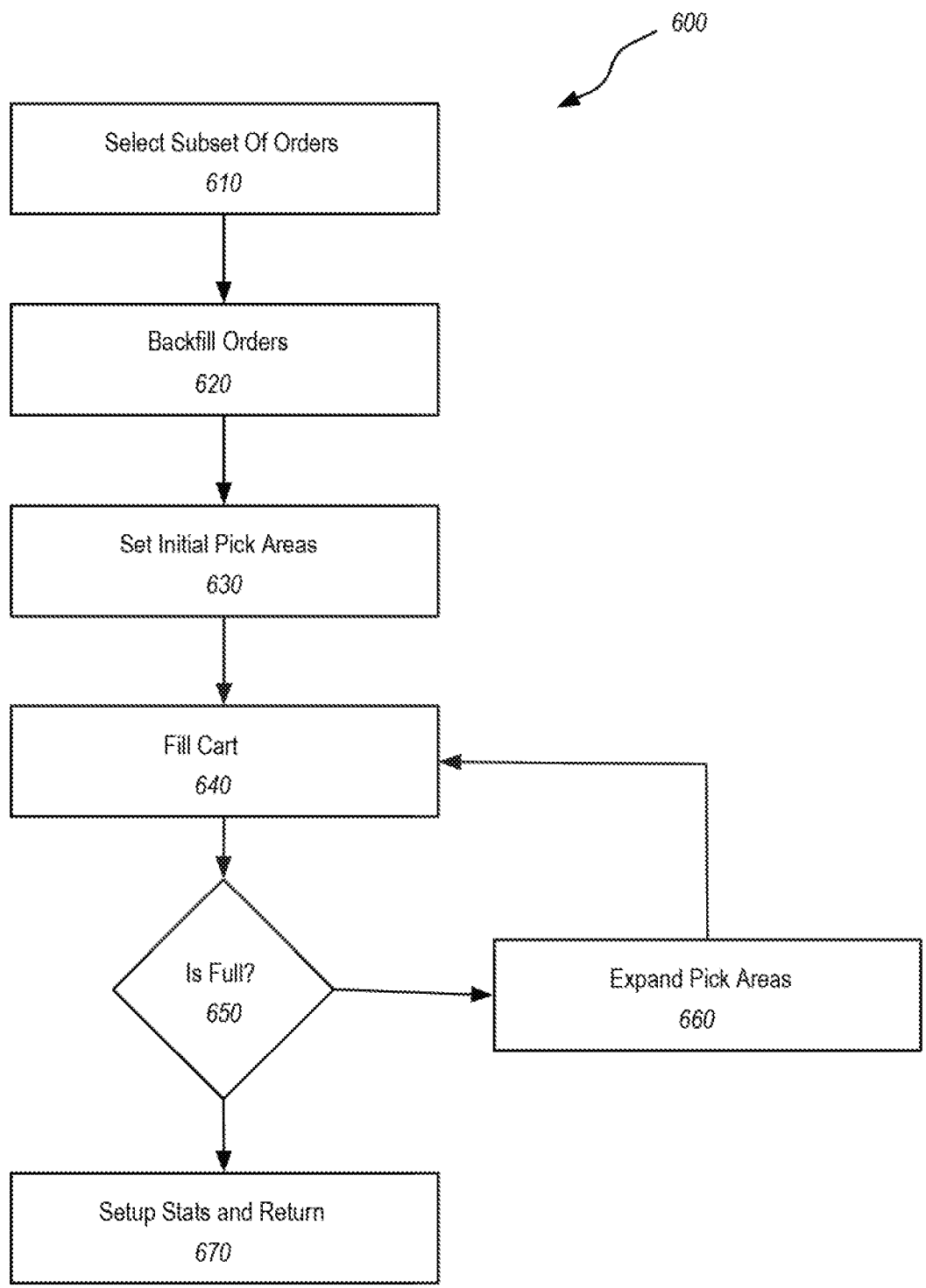
FIG. 6 illustrates a flowchart of an embodiment of steps in a method for generating a pick request.

FIG. 6 illustrates a flowchart of an embodiment of steps in a method 600 for generating a pick request. Method 600 includes a step 610 of selecting a subset of orders. In at least one embodiment, this subset is selected based on what orders need to go out sooner and how many picks they have.

Method 600 also includes a step 620 of backfilling orders. As described above, in at least one embodiment, the computer system 500 can backfill orders by adding to the subset of orders, orders that are on the search path but not on the hottest pick area. Such a system allows for a picking cart 120 to be more fully loaded and for other areas to be gathered more quickly.

Additionally, Method 600 includes step 630 of setting initial pick areas. In at least one embodiment, the computer system 500 will pick the smallest set of nodes to start from. For instance, in at least one embodiment, the computer system 500 may identify a large number of orders that are associated with the ranking node. In such a case, the computer system 500 may dynamically limit the number of searched orders by randomly selecting a particular number of orders from the large number of orders. Additionally or alternatively, the computer system 500 may select only the orders with the highest order priorities.

Method 600 then includes step 640 of filling the picking cart 120. Step 640 comprises the utilization of the cubing algorithm in order to determine that a picking cart 120 is full by volume utilization and/or weight. As indicated by step 650, if the picking cart 120 is not filled on the selected nodes, the computer system 500 perform step 660 and expand the pick areas by adding a new node to the selection of associated nodes and try to fill the picking cart 120 again. It will repeat this process until the picking cart 120 is full. Once a picking cart 120 is full, step 670 provides setup statistics and returns to the first step 610. The provided statistics may provide insights about the picking cart 120 that was created, such as feet per unit, utilization and more.

Figure 7:
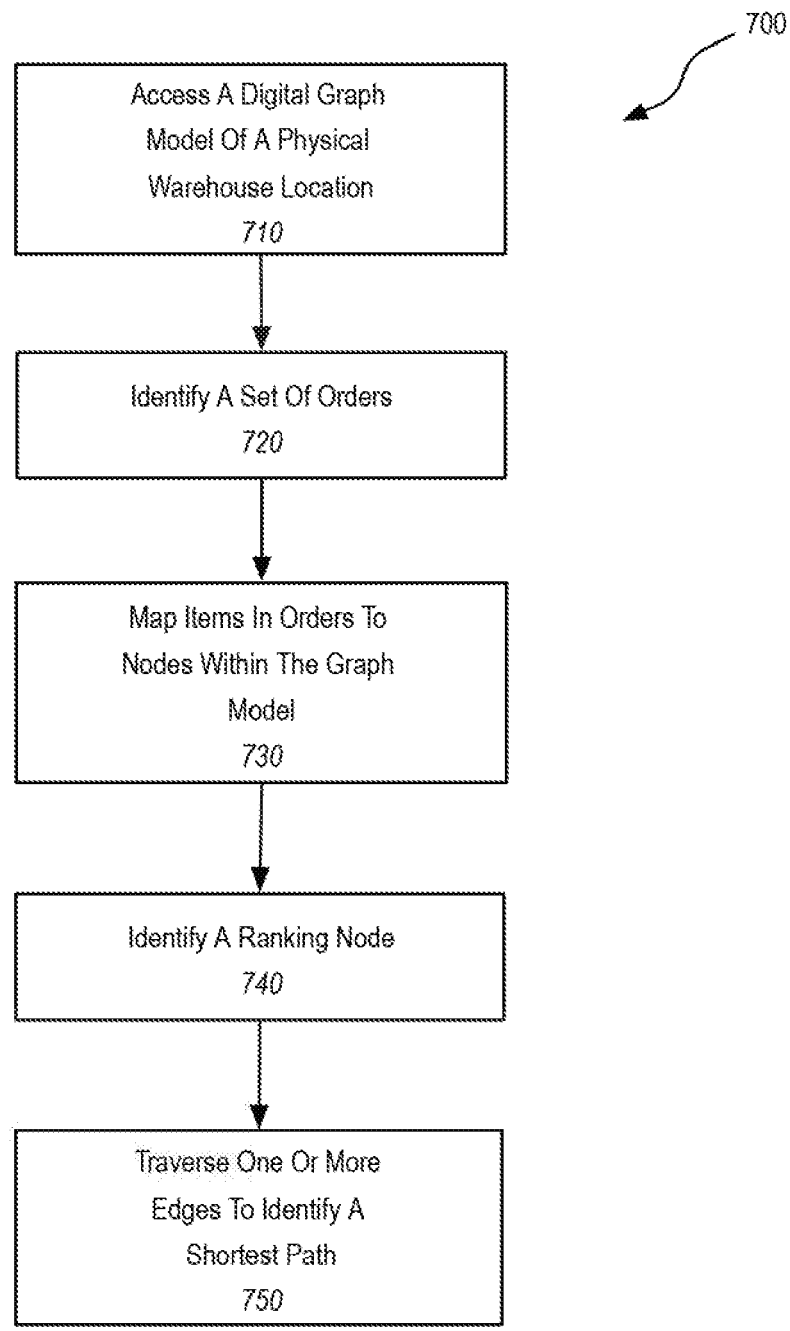
FIG. 7 illustrates a flowchart of an embodiment of steps in a method for identifying a pick request path.

Turning now to FIG. 7, FIG. 7 illustrates a flowchart of an embodiment of steps in a method 700 for identifying a pick request path. Method 700 includes a step 710 of accessing a digital graph model 400 of a physical warehouse location 200. Act 710 comprises access a digital graph model of a physical warehouse location. The digital graph model comprises information indicating a location of multiple specific items of inventory among shelves in the physical warehouse location. Additionally, the digital graph model comprises multiple nodes and multiple edges, the multiple nodes each representing a different physical area within the physical warehouse location and the multiple edges each representing a physical pathway between each node within the multiple nodes and each node's immediate neighbors. For example, as depicted and described with respect to FIGS. 2-4 and the accompanying description, a physical warehouse location 200 can be converted into a digital graph model 400 that depicts nodes representative of picking areas within the warehouse location 200 and edges representative of paths between the nodes.

Method 700 also includes a step 720 of identifying a set of orders. Step 720 comprises identifying, within an order request database 540, a set of orders, wherein each order within the set of orders comprises one or more items and an order priority. As depicted and described with respect to FIGS. 3-5 and the accompanying description, the computer system 500 can access, from within the order request database 540, orders that were received from customer computers 580(*a-c*).

Additionally, Method 700 includes step 730 of mapping items in orders to nodes within the digital graph model. Step 730 comprises mapping each item in each order selected from the set or orders to the multiple nodes within the digital graph model. For example, as depicted and described with respect to FIG. 3-5, the computer system 500 utilizes inventory map 560 to map items within orders to nodes within the warehouse location 200.

Further, method 700 includes step 740 of identifying a ranking node. Step 740 comprises identifying a ranking node from the multiple nodes, wherein the ranking node comprises a node with the highest number of mapped items. For example, as depicted in FIGS. 4 and 5, the computer system 500 identifies Node G as the ranking node because Node G is associated with the greatest number of items from the orders.

Further still, method 700 includes a step 750 of traversing one or more edges to identify a shortest path. Step 750 comprises traversing one or more edges that extend from the ranking node to identify a shortest path within the digital graph model to fill a digital model of a picking cart above a packing threshold level. For example, as depicted and described with respect to FIGS. 4 and 5, the computer system 500 iteratively traverses edges extending away from the ranking node until a pick request is generated based upon a picking cart 120 being filled to a threshold.

Further, the methods may be practiced by a computer system including one or more processors and computer-readable media such as computer memory. In particular, the computer memory may store thereon computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for optimizing node and edge selections within a digital graph model, comprising:
   one or more processors; and
   one or more computer-readable media having stored thereon executable instructions that when executed by the one or more processors configure the computer system to perform at least the following:
   access a digital graph model of a physical warehouse location, wherein:
      the digital graph model comprises information indicating a location of multiple specific items of inventory among shelves in the physical warehouse location, and
      the digital graph model comprises multiple nodes and multiple edges, the multiple nodes each representing a different physical area within the physical warehouse location and the multiple edges each representing a physical pathway between each node within the multiple nodes and each node's immediate neighbors;
   identify, within an order request database, a set of orders, wherein each order within the set of orders comprises one or more items and an order priority;
   map each item in each order selected from the set of orders to the multiple nodes within the digital graph model;
   identify a ranking node from the multiple nodes, wherein the ranking node comprises a node with a highest number of mapped items; and
   traverse one or more edges that extend from the ranking node to identify a shortest path within the digital graph model to fill a digital model of a picking cart above a packing threshold level.

2. The computer system as recited in claim 1, wherein the executable instructions include instructions that are executable to configure the computer system to:
   generate a pick request based upon the shortest path, wherein the pick request comprises one or more orders selected from the set of orders that are located along the shortest path.

3. The computer system as recited in claim 2, wherein the executable instructions include instructions that are executable to configure the computer system to:
   display, on a user interface, one or more visual directions for a user to travel within the physical warehouse location to complete the pick request.

4. The computer system as recited in claim 2, wherein the executable instructions include instructions that are executable to configure the computer system to:
   generate one or more computer instructions for communication to an automated picking device, wherein the one or more computer instructions cause the automated picking device to travel along the shortest path.

5. The computer system as recited in claim 2, wherein traversing the one or more edges that extend from the ranking node to identify the shortest path within the digital graph model comprises:
   accessing the ranking node within the digital graph model;
   identifying a subset of orders within the one or more orders that are each associated with at least one item located at the ranking node;
   identify a set of associated nodes that are associated with items from the subset of orders;
   traversing each edge extending from the ranking node to one or more associated nodes of the ranking node;
   at the one or more associated nodes, identifying additional items associated with orders within the subset of orders;
   identifying one or more completed orders by continuing to traverse each edge extending from the ranking node to each of the one or more associated nodes until the one or more completed orders are completely accounted for among the set of associated nodes; and
   generating the pick request when the digital model of the picking cart is determined to be filled above the packing threshold level with completed orders.

6. The computer system as recited in claim 5, wherein determining that the digital model of the picking cart is filled above the packing threshold level with the one or more completed orders comprises:
   applying a cubing algorithm to the one or more completed orders; and
   determining based upon results of the cubing algorithm that the digital model of the picking cart is filled above the packing threshold level.

7. The computer system as recited in claim 5, wherein generating the pick request comprises:
   including, within the pick request, a particular order that is associated with a particular order priority that exceeds a priority threshold, wherein the particular order does not fall along the shortest path.

8. The computer system as recited in claim 5, wherein the packing threshold level comprises a weight.

9. The computer system as recited in claim 5, wherein the packing threshold level comprises a volume utilization.

10. A computer-implemented method for optimizing node and edge selections within a digital graph model, the computer-implemented method performed at a computer system comprising one or more processors and computer-readable media, the computer-implemented method comprising:
    accessing a digital graph model of a physical warehouse location, wherein:
       the digital graph model comprises information indicating a location of multiple specific items of inventory among shelves in the physical warehouse location, and
       the digital graph model comprises multiple nodes and multiple edges, the multiple nodes each representing a different physical area within the physical warehouse location and the multiple edges each representing a physical pathway between each node within the multiple nodes and each node's immediate neighbors;
    identifying, within an order request database, a set of orders, wherein each order within the set of orders comprises one or more items and an order priority;
    mapping each item in each order selected from the set of orders to the multiple nodes within the digital graph model;
    identifying a ranking node from the multiple nodes, wherein the ranking node comprises a node with a highest number of mapped items; and
    traversing one or more edges that extend from the ranking node to identify a shortest path within the digital graph model to fill a digital model of a picking cart above a packing threshold level.

11. The computer-implemented method as recited in claim 10, further comprising:
    generating a pick request based upon the shortest path, wherein the pick request comprises one or more orders selected from the set of orders that are located along the shortest path.

12. The computer-implemented method as recited in claim 11, further comprising:
    displaying, on a user interface, one or more visual directions for a user to travel within the physical warehouse location to complete the pick request.

13. The computer-implemented method as recited in claim 11, further comprising:
    generating one or more computer instructions for communication to an automated picking device, wherein the one or more computer instructions cause the automated picking device to travel along the shortest path.

14. The computer-implemented method as recited in claim 11, wherein traversing the one or more edges that extend from the ranking node to identify the shortest path within the digital graph model comprises:
    accessing the ranking node within the digital graph model;
    identifying a subset of orders within the one or more orders that are each associated with at least one item located at the ranking node;
    identify a set of associated nodes that are associated with items from the subset of orders;
    traversing each edge extending from the ranking node to one or more associated nodes of the ranking node;
    at the one or more associated nodes, identifying additional items associated with orders within the subset of orders;
    identifying one or more completed orders by continuing to traverse each edge extending from the ranking node to each of the one or more associated nodes until the one or more completed orders are completely accounted for among the set of associated nodes; and
    generating the pick request when the digital model of the picking cart is determined to be filled above the packing threshold level with completed orders.

15. The computer-implemented method as recited in claim 14, wherein determining that the digital model of the picking cart is filled above the packing threshold level with completed ordered comprises:
    applying a cubing algorithm to the one or more completed orders; and
    determining based upon results of the cubing algorithm that the digital model of the picking cart is filled above the packing threshold level.

16. The computer-implemented method as recited in claim 14, wherein generating the pick request comprises:
    including, within the pick request, a particular order that is associated with a particular order priority that exceeds a priority threshold, wherein the particular order does not fall along the shortest path.

17. The computer-implemented method as recited in claim 14, wherein the packing threshold level comprises a weight.

18. The computer-implemented method as recited in claim 14, wherein the packing threshold level comprises a volume utilization.

19. A computer-readable media comprising one or more physical computer-readable storage media having stored thereon computer-executable instructions that, when executed at a processor, cause a computer system to perform a method for creating a packaging template after an order has been gathered, the method comprising:
- accessing a digital graph model of a physical warehouse location, wherein:
  - the digital graph model comprises information indicating a location of multiple specific items of inventory among shelves in the physical warehouse location, and
  - the digital graph model comprises multiple nodes and multiple edges, the multiple nodes each representing a different physical area within the physical warehouse location and the multiple edges each representing a physical pathway between each node within the multiple nodes and each node's immediate neighbors;
- identifying, within an order request database, a set of orders, wherein each order within the set of orders comprises one or more items and an order priority;
- mapping each item in each order selected from the set of orders to the multiple nodes within the digital graph model;
- identifying a ranking node from the multiple nodes, wherein the ranking node comprises a node with a highest number of mapped items; and
- traversing one or more edges that extend from the ranking node to identify a shortest path within the digital graph model to fill a digital model of a picking cart above a packing threshold level.

20. The computer-readable media as recited in claim 19, wherein traversing the one or more edges that extend from the ranking node to identify the shortest path within the digital graph model comprises:
- accessing the ranking node within the digital graph model;
- identifying a subset of orders within one or more orders that are each associated with at least one item located at the ranking node;
- identify a set of associated nodes that are associated with items from the subset of orders;
- traversing each edge extending from the ranking node to one or more associated nodes of the ranking node;
- at the one or more associated nodes, identifying additional items associated with orders within the subset of orders;
- identifying one or more completed orders by continuing to traverse each edge extending from the ranking node to each of the one or more associated nodes until the one or more completed orders are completely accounted for among the set of associated nodes; and
- generating a pick request when the digital model of the picking cart is determined to be filled above the packing threshold level with completed orders.

* * * * *